United States Patent [19]

Bruce, Jr.

[11] 3,878,257

[45] Apr. 15, 1975

[54] CATALYTIC CONVERSION OF 1,1,2-TRICHLOROTRIFLUOROPROPENE-1 TO 2-CHLOROPENTAFLUOROPROPENE

[75] Inventor: John MacMillan Bruce, Jr., Wilmington, Del.

[73] Assignee: E. I. du Pont de Nemours and Company, Wilmington, Del.

[22] Filed: Aug. 10, 1973

[21] Appl. No.: 387,478

[52] U.S. Cl............................. 260/653.4; 252/468
[51] Int. Cl............................................. C07c 17/20
[58] Field of Search.................................. 260/653.4

[56] References Cited
UNITED STATES PATENTS
2,917,558  12/1959  Cunningham et al............ 260/653.4

*Primary Examiner*—Daniel D. Horwitz

[57] ABSTRACT

In conversion of 1,1,2-trichlorotrifluoropropene-1 to 2-chloropentafluoropropene, a catalyst is employed of divalent zinc and activated anhydrous chromium (III) oxide.

4 Claims, No Drawings

CATALYTIC CONVERSION OF 1,1,2-TRICHLOROTRIFLUOROPROPENE-1 TO 2-CHLOROPENTAFLUOROPROPENE

BACKGROUND OF THE INVENTION

The compound, 2-chloropentafluoropropene is known in the art as a fumigant. As disclosed in U.S. Pat. No. 2,917,558, the compound may be prepared by reaction of 1,1,2-trichlorotrifluoropropene-1 with hydrogen fluoride at a temperature above 300°F. utilizing anhydrous aluminum fluoride catalyst.

SUMMARY OF THE INVENTION

The present invention is directed to the production of 2-chloropentafluoropropene in high conversion and yield by reaction of hydrogen fluoride with 1,1,2-trichlorotrifluoropropene-1 employing as a catalyst activated anhydrous chromium (III) oxide in combination with divalent zinc ion.

Conversion of 1,1,2-trichlorotrifluoropropene-1 to 2-chloropentafluoropropene is set forth in U.S. Pat. No. 2,917,558 with disclosed yields of 27 and 29 percent. In contrast with the catalyst combination of this disclosure, conversions of the order of 95–100 percent and yields of the order of 80 percent have been obtained.

In addition to use as a fumigant, the compound is a useful intermediate in making hexafluoropropene.

DETAILED DESCRIPTION OF THE INVENTION

The use of activated anhydrous chromium (III) oxide in combination with divalent zinc as catalyst allows both a high conversion of $CF_3CCl=CCl_2$ and a high yield of $CF_3CCl=CF_2$.

The activated anhydrous chromium (III) oxide portion of the catalyst is disclosed in U.S. Pat. No. 3,258,500. The oxide is activated by heating in an inert atmosphere at about 400°C. to about 600°C. with a preferred temperature of the order of 500°C.

A preferred type of anhydrous chromium (III) oxide catalyst is one with a high surface area and is of the gel type. This catalyst is specifically disclosed in U.S. Pat. No. 3,258,500 as well as by Ruthruff in "Inorganic Syntheses", Vol. II, pages 190 to 193 published in 1946 by Mc Graw-Hill Book Co.

The remaining portion of the catalyst consists of divalent zinc ion which will be present as a solid compound at the operating temperatures and pressures of the reaction. Suitable examples of compounds useful are divalent zinc salts including zinc chloride, zinc bromide, zinc iodide, zinc sulfate and zinc acetate.

It is believed that the zinc salt is converted to zinc fluoride at the operating conditions of the reaction since zinc salts with low melting points may be employed. In any event the $zinc^{++}$ ion is present in the catalyst combination at the reaction conditions employed.

The concentration of $Zn^{++}$ may vary over a wide range relative to the chromium oxide since criticality exists in the combination of anhydrous (III) oxide and divalent zinc rather than the amount of each portion of the catalyst. An illustrative concentration of $zinc^{++}$ is from 1 to 20 mole percent with a preferred range of 12 to 16 percent.

The catalyst may also contain diluents, carriers and small quantities of impurities.

The reaction of $CF_3CCl=CCl_2$ with hydrogen fluoride is undertaken in the vapor phase at temperatures between 400 to 600°C. A preferred temperature range is between 490° and 510°C. Low temperatures will result in lower conversion rates and yields while excessively high temperature promotes formation of by-products which lowers the yield of the desired compound.

The pressure employed is not critical and illustratively pressures between one and ten atmospheres may be used.

For the hydrofluorination, hydrogen fluoride is the preferred source of the hydrogen and fluorine. However, it is within the scope of this invention to employ separate source materials which serve as the hydrogen fluoride precursor. Illustratively, these source materials may act in situ to form hydrogen fluoride at the operating conditions of the catalytic conversion. The hydrogen fluoride will be at an excess over that required for conversion of the 1,1,2-trichlorotrifluoropropene-1. Molar ratios based upon hydrogen fluoride to $CF_3CCl=CCl_2$ may range from 2:1 to 30:1. A preferred ratio will be of the order of 10:1.

The contact time of $CF_3CCl=CCl_2$ and the hydrogen fluoride with the catalyst will be dependent upon the operating conditions and the activity of the catalyst. Higher operating temperatures will denote a shorter requirement for catalyst contact. Contact times of the order of about 1 minute or less may be used with a contact time of 1 to 20 seconds preferred. A more preferred contact time is 2 to 10 seconds. Excessively long contact times will denote an excess formation of by-product compounds.

To further illustrate the innovative aspects of the invention, the following examples are provided:

EXAMPLE I

CATALYST PREPARATION

Chromium oxide ($Cr_2O_3$) in the form of a gel was prepared in accordance with the technique disclosed in Inorganic Syntheses, 2, 190.

Into a beaker was placed 80 grams of the $Cr_2O_3$ which was covered with a solution of 30 grams $ZnCl_2$ dissolved in 80 ml. water. The $Cr_2O_3$ decrepitated upon treatment with the aqueous solution. With occasional stirring of the mixture, water was evaporated in an oven maintained at a temperature of 125°C.

SYNTHESES OF $CF_3CCl=CF_2$

A 1 inch × 18 inches nickel reactor tube containing a thermocouple well in the center, was charged with 53 grams (4 inches bed) of the $Cr_2O_3$-$Zn^{++}$ catalyst described above. The catalyst was heated at 400°C. under a stream of $N_2$ for a period of 16 hours and then treated with HF (135 cc/min) for 3.5 hours. The temperature of the reactor was maintained between 500°–504° while the following were added at the rates indicated: HF, 135 cc/min; $CF_3CCl=CCl_2$, 12 cc/min; $N_2$, 60 cc/min. After running a period of about 6 hours a sample of effluent was analyzed by GC analysis which disclosed the following: conversion of $CF_3CCl=CCl_2$, 97 percent; yields: $CF_3CCl=CF_2$, 83 percent; $CF_3CCl=CFCl$, 13 percent; $CF_3CH=CF_2$, 3 percent; other, 1 percent. Contact time in the 4 inches catalyst bed was about 6 seconds.

EXAMPLE 2

In a similar procedure as Example 1, the 1 inch × 18 inches nickel reactor was charged with a 3½ inches bed of $Cr_2O_3$ as catalyst (no $Zn^{++}$ present) which was held at 400°C. under $N_2$ for 16 hours followed by treatment with HF (135 seconds/min.) at 400°C. for two hours and 500°C. for 3 hours. HF, $CF_3CCl\text{-}CCl_2$ and $N_2$ were added in the same fashion as in Example 1.

After operating at about 500° for about 2 hours GC analysis of the effluent disclosed the following: conversion of $CF_3CCl=CCl_2$; 99 percent; $CF_3CCl=CF_2$, 22 percent; $CF_3CCl=CFCl$, 6 percent; $CF_3CH=CF_2$, 8 percent; $CF_2Cl_2$, 6 percent; $CF_3CH_2CF_3$, 23 percent; $CF_3CHClCF_3$, 21 percent; other, 14 percent. Contact time was about 5.5 seconds.

Although the invention has been described by way of specific embodiments, it is not intended to be limited thereto. As will be apparent to those skilled in the art, numerous embodiments can be made without departing from the spirit of the invention or the scope of the following claims.

What is claimed is:

1. In a catalyzed reaction at a temperature of about 400° to 600°C. of 1,1,2-trichlorotrifluoropropene-1 with hydrogen fluoride to form 2-chloropentafluoropropene, the improvement comprising employing a catalyst combination of activated anhydrous chromium (III) oxide and a divalent zinc compound.

2. The process of claim 1 wherein said oxide is present as a gel and said divalent zinc compound is present as a zinc salt.

3. The process of claim 2 wherein said zinc compound is present in an amount of 1 to 20 mole percent of said catalyst combination.

4. The process of claim 3 wherein a catalyst contact time of 1 to 20 seconds is used.

* * * * *